United States Patent

[11] 3,617,677

| [72] | Inventors | Klaus Ritter;<br>Gerd Ritter; Josef Ritter; Hans Gott, all of Graz, Austria |
|---|---|---|
| [21] | Appl. No. | 855,663 |
| [22] | Filed | Sept. 5, 1969 |
| [45] | Patented | Nov. 2, 1971 |
| [73] | Assignee | EVG Entwicklungs-u.<br>Verwertungsgesellschaft m.b.H.<br>Graz, Austria |
| [32] | Priorities | Sept. 20, 1968 |
| [33] | | Austria |
| [31] | | 9218/68;<br>Feb. 20, 1969, Austria, No. 1728/69 |

[54] METHOD OF MANUFACTURING WELDED STEEL GRATINGS
11 Claims, 8 Drawing Figs.

[52] U.S. Cl. ................................................ 219/58,
219/118, 219/94
[51] Int. Cl. ...................................................... B23k 11/16

[50] Field of Search............................................ 219/93, 94,
117, 58, 118, 56

[56] References Cited
UNITED STATES PATENTS
1,039,135   9/1912   Johnson ......................   219/94
3,165,815   1/1965   Wögerbauer................   219/93 X Primary Examiner—J. V. Truhe
Assistant Examiner—J. G. Smith
Attorney—Ernest F. Marmorek ABSTRACT: A method of manufacturing welded steel gratings by resistance welding includes the use of jointing pads inserted between the alloy steel wires which are to be joined. The jointing pads are made of soft iron or low carbon steel so that they will be able to take considerable stress. Preferably the dimensions of the jointing pads are selected so that the pads will act as heat sinks preventing the wires from cooling too rapidly. Pads which are relatively large or have a high volume of surface ratio have been found to be desirable.

PATENTED NOV 2 1971  3,617,677

INVENTORS:
Klaus Ritter,
Gerd Ritter,
Josef Ritter and
Hans Gött,
BY
THEIR ATTORNEY

METHOD OF MANUFACTURING WELDED STEEL GRATINGS

This invention relates to a method of manufacturing welded steel gratings by welding together crossed arrays of wires or rods at their crossing points, by electric resistance welding.

Up to now for manufacturing welded wire gratings it has only been possible to use wires or rods of nonalloy or low alloy low carbon steels, because rods made of alloy steels, such as high carbon steel and particularly rods made of high alloy steels, cannot be welded together satisfactorily by resistance welding. Rods of this kind tend to become brittle in the welding region, moreover the weld itself is easily ruptured. These difficulties are increased by the presence of a layer of scale on the rod, which is usually present in the case of hot rolled rod.

Rods made of nonalloy or low alloy, low carbon steels can be satisfactorily welded together to form gratings. However for many purposes, in particular for the gratings used in reinforced concrete construction, it is necessary to increase the mechanical strength of the rods by a cold working process, for example by cold drawing. If the cold working does not at the same time remove the layer of scale from the rod, it is also necessary to remove the scale in a separate operation, before the rods can be used for manufacturing the crossed grating.

These extra manufacturing processes are costly. Moreover difficulties are encountered in cold drawing and otherwise cold working rod of comparatively large diameter. It is therefore often desired to use, for manufacturing gratings rolled steels which are naturally hard and are not coated with scale, that is to say alloy steels which already have the necessary mechanical properties without cold working. However up to the present, as already mentioned, it has not been possible to resistance weld these naturally hard alloy steels to form gratings. Attempts have been made to do so with the help of clamping wires or plastic clamping sleeves or the like, these devices assisting in the manipulation of the wires. However joining the wires together in this way is tedious and time consuming. A further disadvantage of this method is that the clamps project from the plane of the grating and interfere with the handling of the grating, for example when it is being pulled off a stack of gratings. Wire clamps and plastic clamps contribute nothing to the shear strength of the grating, although an increase in shear strength at the crossing points is often desired, for example in the case of concrete reinforcing gratings.

In attempting to remove these difficulties in welding rods of naturally hard steel, it has already been proposed to prevent the rods from becoming brittle in the region of the weld by heating the rods, just before or during the welding operation. This is to prevent the rods from cooling too quickly in the region of the weld. It is also possible to remove the brittleness resulting from excessively rapid cooling by applying a subsequent annealing process. However the extra operation of heating the mass of rods before or during the welding operation not only consumes energy but also requires the use of expensive extra apparatus on the welding machine. A subsequent annealing of the completed grating also consumes power, and requires the use both of an extra annealing oven, and of extra labor and time.

It has now been found that the disadvantages of the older proposals mentioned above can be avoided in a method of making alloy steel wire gratings by welding together crossed wires at their crossing points by using electric resistance welding, wherein according to the invention jointing pads are inserted between the wires at their crossing points, the jointing pads being made of a material which welds well to the alloy steel wires, and each jointing pad is heated by the welding current and compressed by an applied pressure so that the material of the jointing pad forms a welded bond holding the two crossed wires together.

Preferably the thickness of the jointing pad, the applied pressure and the magnitude of the welding current are all adjusted in such a way that, after the welding has been completed, the crossed wires do not touch each other directly but are separated by the material of the jointing pad.

If there are used, in the process according to the invention, naturally hard steels of the usual commercial kind, particularly gate steel, star steel and high alloy scaled rolled steel, there being inserted between the crossed wires jointing pads made of soft iron of high purity, the resulting grating has at the crossing points a mechanical strength great enough to withstand to a high degree the shear stresses and bending stresses encountered.

Preferably the dimensions of the jointing pads are greater than what is necessary for making the welded joint, so that each jointing pad acts as a heat sink preventing the wires from cooling too rapidly, after completion of the welding operation, and so preventing even hard rods from becoming brittle in the welding region.

The method according to the invention will now be described by way of example and with reference to the accompanying drawings in which.

Figure 1:
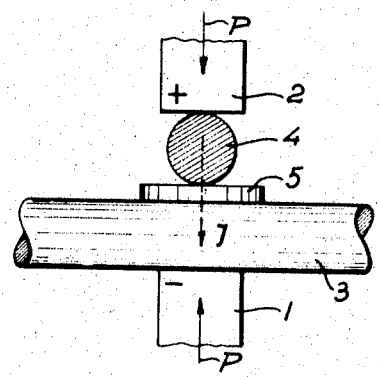
FIG. 1 shows an arrangement of welding electrodes and wires which are to be welded together.

In FIG. 1 a pair of electrodes 1 and 2 are arranged as is conventional in electrical resistance spot welding machines for making wire gratings. A alloy steel wire 3, for example a longitudinal wire, rests upon the lower electrode 1. A similar transverse wire 4 is thrust downwards towards the longitudinal wire 3 by an upper electrode 2.

A jointing pad 5 is interposed at the crossing point between the transverse wire 4 and the longitudinal wire 3. The jointing pad 5 is made of a material which welds well to the alloyed steel of the wires 3 and 4. For example the jointing pad can be made of soft iron of high purity. The welding current I flows between the two electrodes 1 and 2 through the jointing pad, heating it to welding temperature, so that the pad is softened or melted. The pressure applied to the jointing pad by the two electrodes, in the directions of the arrows P deforms the softened jointing pad, bringing its surface into intimate contact with the surfaces of the two wires, so that the surfaces of the wires melt locally, producing good welded joints between the wires and the jointing pad, on the two sides of the jointing pad.

Figure 2:
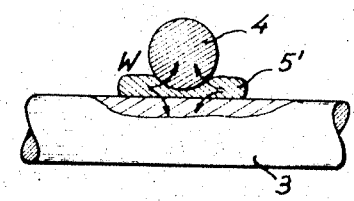
FIG. 2 is a section through a welding region.

The thickness of the jointing pad 5 is such that under the influence of the applied pressure P and the welding current I the jointing pad becomes deformed somewhat as represented at 5' in FIG. 2 but not enough to bring the two wires into contact with each other, the two wires still remaining separated from each other by the material of the jointing pad 5'.

In welding wires made of a steel which easily becomes brittle, it has been found advantageous to make the jointing pad 5 bigger than what would be required for the welded joint, so that the jointing pad acts as a heat sink, allowing the weld to cool down comparatively slowly. The heat stored in the jointing pad 5' is gradually transferred, as represented by the arrows in FIG. 2, to the weld and to the neighboring parts of the two wires 3 and 4. The comparatively slow cooling of the wires prevents the development of brittleness.

Figure 3:
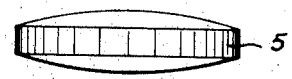
FIGS. 3 to 8 illustrate several different modifications of jointing pads.
Figure 4:
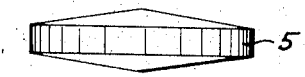

Under certain circumstances it is an advantage to use jointing pads with domed or conical surfaces, as shown in FIGS. 3 and 4 or with pyramidal surfaces. The purpose of this is to form initial point contacts which produce a high local current density at the beginning of the welding operation, so that the electric current can easily strike through the layer of scale, and so that the melting of the metal is easily initiated.

Figure 5:
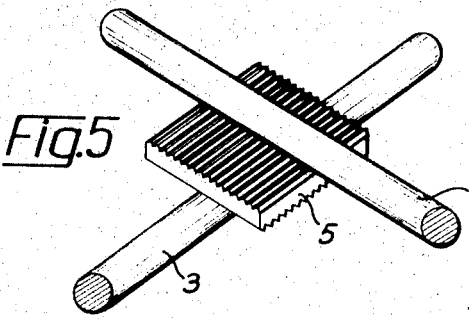

For the same reasons, the jointing pad can have a corrugated or rippled surface, as represented in FIG. 5, the corrugations on the two sides of the pad extending transversely to the wire which is in contact with the corrugated surface. This arrangement also increases the current density at the contact points, and at the same time favors penetration through the scale by the electric current, by a mechanical action.

Figure 6:
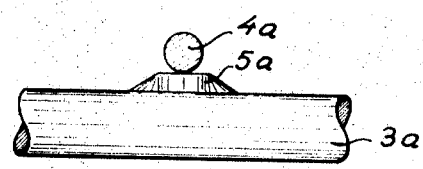

In cases where two wires differing greatly in diameter are to be joined together by welding as represented in FIG. 6, which shows a transverse wire 4a of lesser diameter and longitudinal wire 3a of greater diameter, the jointing pad is preferably frustoconical as shown at 5a in FIG. 6. The larger surface of the pad is in contact with the wire of large diameter 3a, and the smaller surface of the pad is in contact with the wire of smaller diameter 4a.

Figure 7:
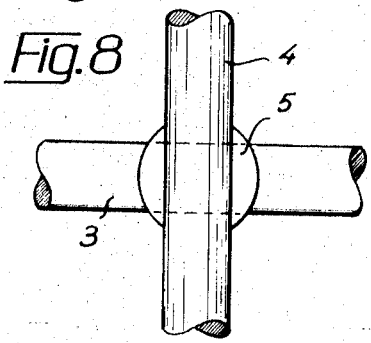

In a further development of the invention the jointing pad 5 is in the form of a circular disc, as shown in FIG. 7. The diameter of the disc is greater than that of the thickest wire. The effect produced is a mechanical reinforcement at the crossing point, similar to that provided by the gusset plates used in steel frame construction.

Figure 8:
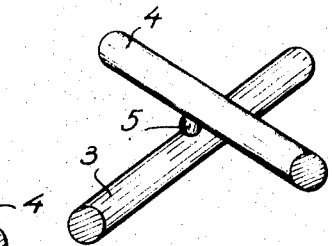

A particular advantage is obtained if according to a still further development of the invention a spherical-shaped jointing pad 5 shown in FIG. 8 is used. A sphere is the geometrical body having the greatest volume to surface ratio and thus has the maximum heat storing capacity while suffering the least heat loss by radiation from its surface. Therefore a sphere is particularly suited for the purpose of storing a great amount of heat for influencing the welding zone. It also permits joining of wires having widely different diameters.

Due to the fact that there is substantially only a point contact between the surface of a spherical jointing pad and the wires to be joined, a high current density as well as a high mechanical tension resulting from the pressure of the electrodes may be reached in the welding zone at the beginning of the welding operation, which effect is particularly advantageous when welding materials having a scaled surface.

The feeding of spherical jointing pads to the welding zone is especially easy to accomplish since even when feeding over a long distance it is sufficient to provide a grooved or tubular feeding track upon which the jointing pads may roll due to their gravity.

As already mentioned, the jointing pads can be made of an iron of high purity. Alternatively other metals can be used, for example alloys, provided that they weld satisfactorily with the crossed wires. There is often a requirement that the jointing pad must be able to take considerable mechanical stresses. In these cases it can be made of a very low carbon steel, whose strength has been increased by the addition of allow elements such as Mn, Cr, Ni, Mo, Nb, Si, Al, Cu or Co. Finally, the jointing pad can if desired be made of sintered metal.

In further development of the invention the jointing pad can if desired have a shape such that after completion of the welding the surface of the jointing pad merges gradually into the surface of the wire, preventing excessive local stresses and consequent risk of cracking by the notch effect, with the result that the dynamic behavior of the wire grating is improved.

The jointing pads can be manufactured in simple ways, for example by flame cutting strip, wire or rod material, or they can be stamped out of sheet or plate. The jointing pads can be manufactured separately, of if desired they can be made up near the welding machine as and when required by the machine. Alternatively the jointing pads can be made by casting or by sinter pressing.

We claim:

1. In a method of welding together at least two round alloy high carbon steel crossed wires at their crossing point using electric resistance welding, the improvement comprising the steps of
    inserting a heat deformable jointing pad between said wires at their crossing point, said pad being composed of a material which welds well to the alloy steel wires, and is of lesser carbon content than said wires, heating said pad by means of the welding current while simultaneously compressing and thereby deforming said pad, said welding current locally melting the surface of said wires and reducing the carbon content of said wires while simultaneously correspondingly raising the carbon content of said pad, whereby said pad forms a welded bond holding said two crossed wires together 2. The method according to claim 1, wherein said jointing pad is overdimensioned relatively to what is required for making the welded joint, whereby said overdimensioned jointed pad acts as a heat sink so that, after the welding has been completed, heat is gradually transferred from said jointing pad to said crossed wires, preventing said crossed wires from cooling too rapidly.

3. The method according to claim 1, wherein said jointing pad has convex surfaces giving initially point contacts with said cross wires.

4. The method according to claim 1, wherein said jointing pad has corrugated surfaces, and said pad is inserted between said wires with said corrugations extending transversely with respect to the direction of the wire with which they are in contact.

5. In a method of welding together at least two crossed wires at their crossing point using electric resistance welding for making alloy steel wire gratings, the improvement comprising the steps of inserting a jointing pad between said wires at their crossing point, said jointing pad being made from a material which welds well to the alloy steel wires, and heating said jointing pad by means of a welding current while compressing said jointing pad by an applied pressure whereby said material of said jointing pad forms a welded bond holding said two crossed wires together, wherein said crossed wires to be welded together have different diameters and said jointing pad is frustoconical having a larger plane surface in contact with the larger of said wires and a smaller plane surface in contact with the smaller of said wires.

6. In a method of making alloy steel wire gratings by welding together crossed wires at their crossing point using electric resistance welding, the improvement comprising the steps of inserting a jointing pad between said wires at their crossing point, said jointing pad being made from a material which welds well to the alloy steel wires, and heating said jointing pad by means of a welding current while compressing said jointing pad by an applied pressure whereby said material of said jointing pad forms a welded bond holding said two crossed wires together, the thickness of said jointing pad, said applied pressure and the magnitude of said welding current are all adjusted in such a way that, after the welding has been completed, said crossed wires are separated by said material of said jointing pad, wherein said jointing pad is a circular disc of a diameter greater than the diameter of the thickest of said crossed wires.

7. In a method of making alloy steel wire gratings by welding together crossed wires at their crossing point using electric resistance welding, the improvement comprising the steps of inserting a jointing pad between said wires at their crossing point, said jointing pad being made from a material which welds well to the alloy steel wires, and heating said jointing pad by means of a welding current while compressing said jointing pad by an applied pressure whereby said material of said jointing pad forms a welded bond holding said two crossed wires together, the thickness of said jointing pad, said applied pressure and the magnitude of said welding current are all adjusted in such a way that, after the welding has been completed, said crossed wires are separated by said material of said jointing pad, wherein said jointing pad is a spherical shaped body.

8. In a method of making alloy steel wire gratings by welding together crossed wires at their crossing point using electric resistance welding, the improvement comprising the steps of inserting a jointing pad between said wires at their crossing point, said jointing pad being made from a material which welds well to the alloy steel wires, and heating each jointing pad by means of a welding current while compressing said jointing pad by an applied pressure whereby said material of said jointing pad forms a welded bond holding said two crossed wires together, the thickness of said jointing pad, said applied pressure and the magnitude of said welding current are all adjusted in such a way that, after the welding has been complete, said crossed wires are separated by said material of said jointing pad,
    wherein said jointing pad is made from soft iron of high purity.

9. The method according to claim 1, wherein said jointing pad is made from a low carbon alloy steel.

10. The method according to claim 1, wherein said jointing pad is made from sintered metal.

11. In a method of welding, as claimed in claim 1, wherein said pad subsequent to welding forms a part of a welded region operable to withstand greater stress than either wire alone or said pad prior to welding.